United States Patent [19]

Koyano et al.

[11] 4,127,186
[45] Nov. 28, 1978

[54] POWER STEERING DEVICE FOR AUTOMOTIVE VEHICLES

[75] Inventors: Kimio Koyano; Yoshihiko Toshimitsu, both of Asaka, Japan

[73] Assignee: Honda Giken Kogyo Kabushiki Kaisha, Tokyo, Japan

[21] Appl. No.: 793,373

[22] Filed: May 3, 1977

[30] Foreign Application Priority Data

May 7, 1976 [JP] Japan .................................. 51-51778
May 7, 1976 [JP] Japan .................................. 51-51779

[51] Int. Cl.² .............................................. B62D 5/10
[52] U.S. Cl. ...................................... 180/148; 74/498; 92/165 R; 92/167
[58] Field of Search ........................ 180/148; 74/498; 92/167, 166, 165 R

[56] References Cited

U.S. PATENT DOCUMENTS

| 2,825,610 | 3/1958 | Jakowchuk | 92/166 X |
| 2,955,667 | 10/1960 | Cota | 180/148 |
| 3,103,986 | 9/1963 | Barton | 180/148 |

FOREIGN PATENT DOCUMENTS 2,404,077 7/1975 Fed. Rep. of Germany ........... 180/148

*Primary Examiner*—John A. Pekar
*Attorney, Agent, or Firm*—Haseltine, Lake & Waters

[57] ABSTRACT

An oil hydraulic power steering device of the rack and pinion type which includes a rack rod supported for lateral oscillation about a fulcrum adjacent one end thereof and a power actuator comprised of a piston secured to the rack rod, an outer cylinder, and an inner cylinder in which the piston is slidably fitted and which is floatingly supported in the outer cylinder. The device further includes a spring for normally biasing the rack rod against the pinion and a mechanism for engaging the normally free end of the rack rod while laterally displacing the rod end to increase the backlash in the rack and pinion gearing as the rack rod approaches the end of its stroke. There is no excessive pressure of contact occurring between the meshing gear teeth and the backlash is self-adjustable as the teeth wear down. The inner cylinder of the actuator is laterally movable to follow the rack rod when the latter is forced to bend while maintaining the concentric relation to the rack rod to enable the latter at all times to operate smoothly.

5 Claims, 3 Drawing Figures

POWER STEERING DEVICE FOR AUTOMOTIVE VEHICLES

BACKGROUND OF THE INVENTION

This invention relates generally to power steering devices for automobiles and like vehicles and more particularly to those of the rack and pinion type including a pinion shaft operatively associated with the steering wheel of the vehicle, a rack rod having a rack formed thereon for meshing engagement with the pinion on the pinion shaft, and an oil-hydraulic power actuator associated with the rack rod to drive the latter axially thereof.

In the past, power steering devices of the type described have generally involved various difficulties in operation and maintenance, including substantial wear of rack and pinion tooth surfaces, which results in increase in backlash, and lateral deflection of the rack rod under load, which often causes the meshing teeth to sieze and impair smooth operation of the rack rod and hence of the device as a whole.

SUMMARY OF THE INVENTION

The present invention seeks to overcome the difficulties previously met as described above and has for its object the provision of a power steering device of the type described in which the rack rod can operate smoothly over the entire length of its stroke and is highly durable.

According to the present invention, there is provided a power steering device of the character described which includes, a rack rod normally supported so as to be laterally oscillatable about a fixed fulcrum point adjacent one end thereof, means for restraining such oscillation of the rack rod and enabling the latter to be supported with increased rigidity when the steering wheel is operated to such an extent that the rack rod approaches the extreme end of its stroke and is subjected to a particularly large bending load, and means for preventing any excessive increase in contact pressure between the meshing rack and pinion teeth.

Another object of the present invention is to provide a power steering device of the character described in which the power actuator can operate smoothly even if the rack rod, of substantial length, is bent under the effect of resistance reactive thereto and thus reliable steering operation is at all times ensured.

The above and other objects, features and advantages of the present invention will be apparent from the following more particular description of a preferred embodiment of the invention, as illustrated in the accompanying drawings.

DESCRIPTION OF THE PREFERRED EMBODIMENT

Figure 1:
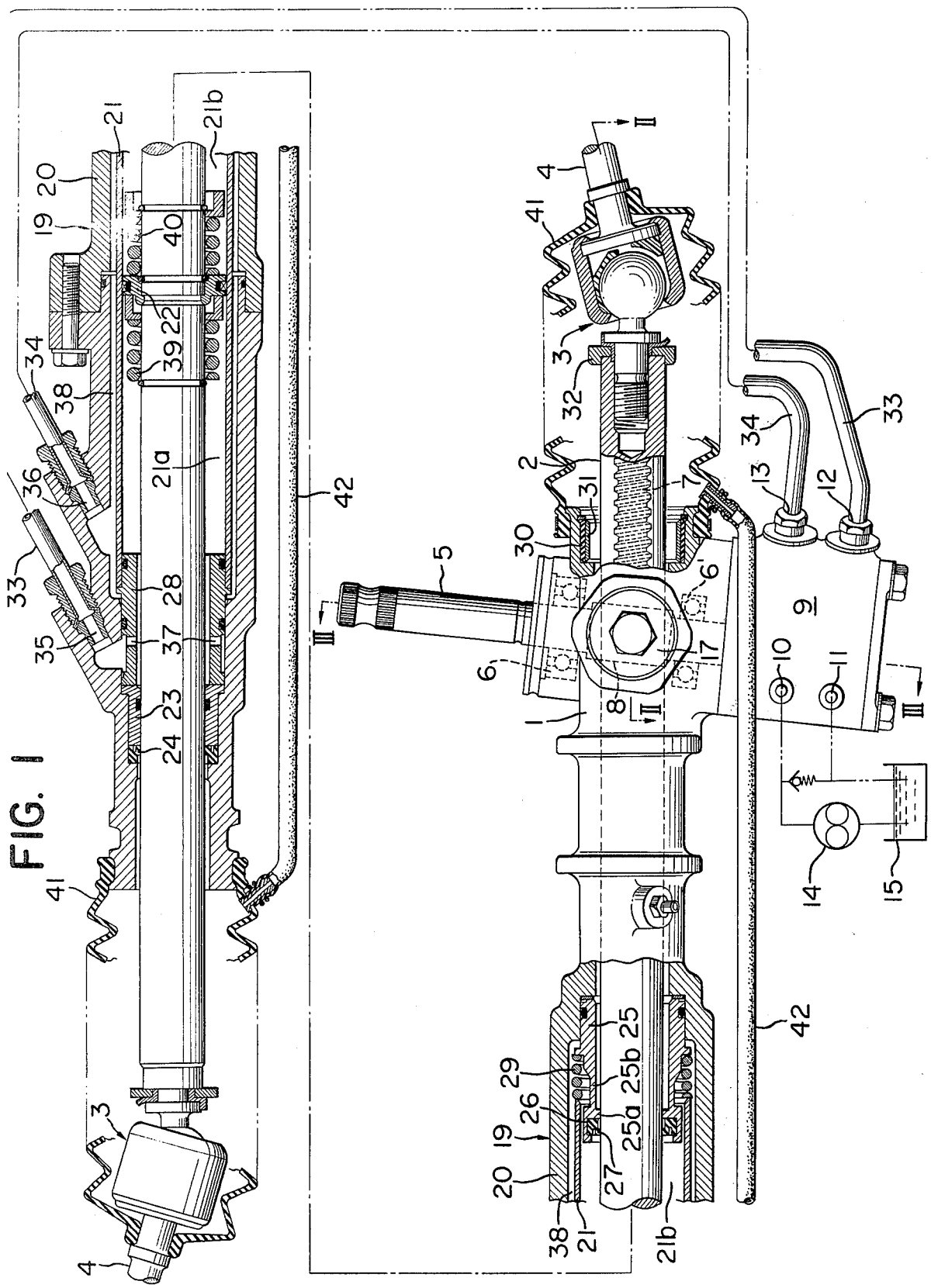
FIG. 1 is a rear elevational view of a preferred embodiment of the present invention, showing the left-hand side and right-hand side halves thereof above and below partly in longitudinal cross section.

Referring to the drawings and first to FIG. 1, reference numeral 1 indicates a steering gear box secured to the chassis of the associated vehicle and 2 indicates a rack rod extending in a direction transverse of the vehicle slidably through the gear box 1. Coupled to the opposite ends of the rack rod 2 through the medium of respective ball joints 3—3 are tie rods 4—4 which are associated with the left and right steerable wheels (not shown) of the vehicle. It is to be understood that as the rack rod 2 is axially moved leftward or rightward from its neutral position, the steerable wheels are steered to the right or left, respectively.

A pinion shaft 5 is supported on the steering gear box 1 through the medium of a pair of ball bearings 6 and 6' mounted thereon and is not only rotatable around its axis extending substantially normal to the axis of rack rod 2 but also is slidable axially within definite limits. The pinion shaft 5 is formed thereon with a pinion 8, which is in meshing engagement with an inclined-tooth rack 7 formed on the rack rod 2 on its front side.

Further, the pinion shaft 5 is connected at one end with the manually operated steering wheel (not shown) of the vehicle through the medium of a universal joint and is operatively associated at the other end with a control valve 9, of known form, arranged on the underside of gear box 1. The control valve 9 is provided in its casing with a high pressure port 10, which is connected with a source of oil hydraulic pressure 14 such as an oil pressure pump, a low pressure port 11, which is connected to an oil reservoir 15, and also a pair of output ports 12-13, and is arranged so that, when the rack rod 2 is driven by the pinion rod 5, the axial displacement of the latter occurring under the effect of the axial component of the reactive force exerted upon the pinion 8 by the rack formation on the rack rod 2 is sensed to place either one of the two output ports 12-13 in fluid communication with the high pressure port 10 while placing the other output port in fluid communication with the low pressure port 11.

Figure 2:
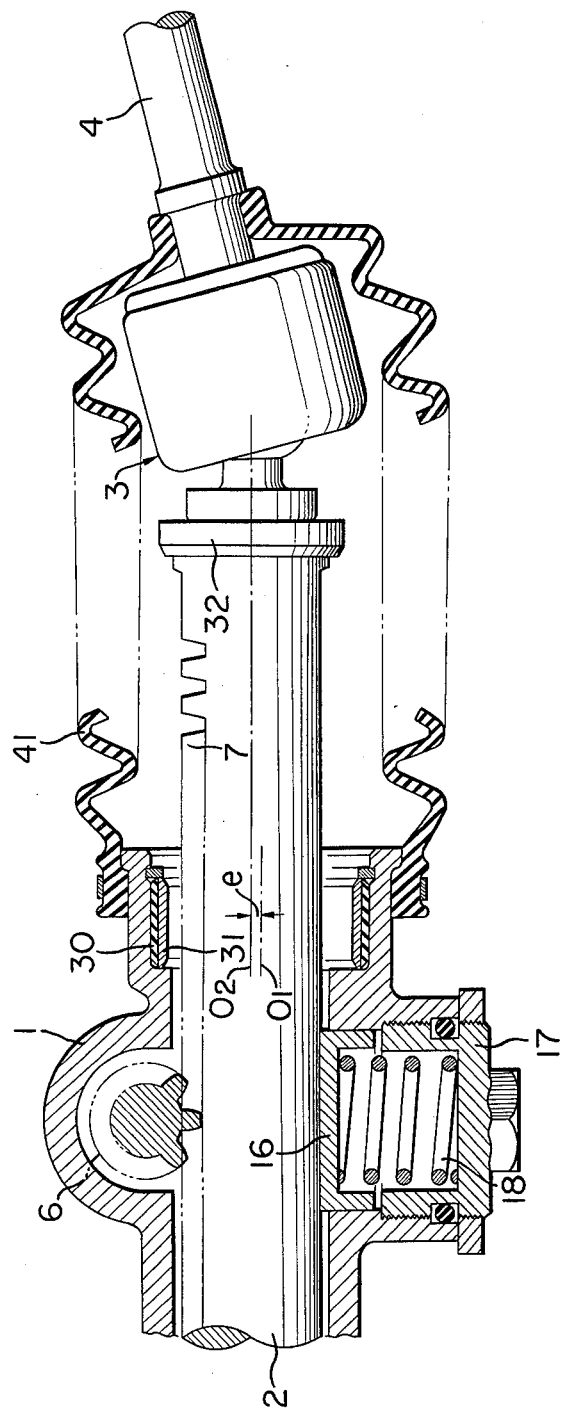
FIG. 2 is an enlarged cross-sectional view taken along line II—II in FIG. 1.
Figure 3:
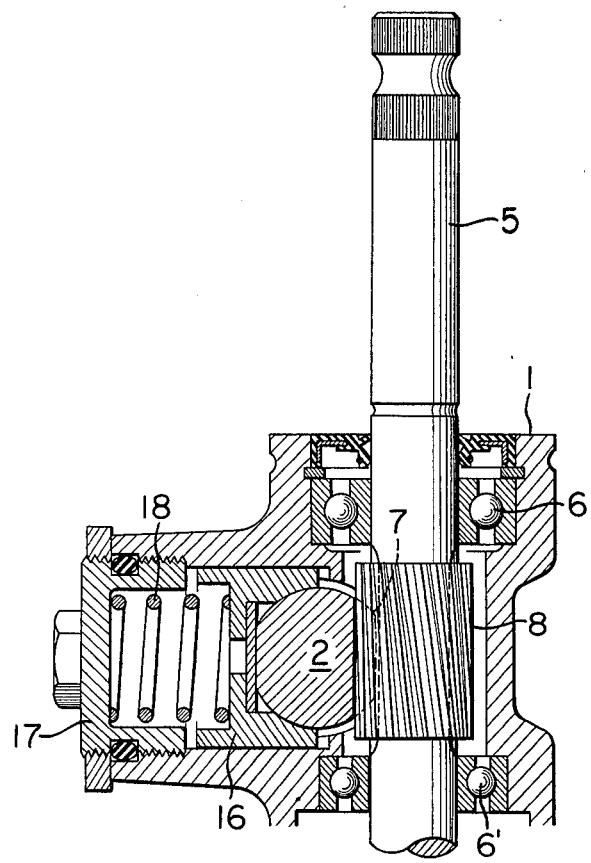
FIG. 3 is a view similar to FIG. 2, taken along line III—III in FIG. 1.

Fitted in the steering gear box 1 is a guide member 16 which slidably supports the rack rod 2 on that side thereof remote from the pinion 8, as shown in FIG. 2. Threadably fitted in that side of the gear box 1 is a retainer cap 17 which holds a coiled compression spring 18 against the guide member 16. The coiled spring 18 acts through the medium of the guide member 16 to urge the rack rod 2 against the pinion 8 so that there is normally no backlash occurring between the meshing rack 7 and pinion 8.

Referring again to FIG. 1, reference 19 generally indicates an oil hydraulic power actuator arranged adjacent the steering gear box 1 in concentric relation to the rack rod 2 and includes an outer cylinder 20 formed integral with the gear box 1 and extending therefrom to the left, an inner cylinder 21 accommodated in the outer cylinder 20 coaxially therewith, and an actuator piston 22 slidably fitted in the inner cylinder 21 and firmly secured to the rack rod 2. As illustrated, the actuator piston 22 defines in the interior of the inner cylinder 21 a left-hand side hydraulic chamber 21a and a right-hand side hydraulic chamber 21b on the opposite sides of the piston. Fitted in the left-hand side end portion of the outer cylinder 20 are a guide bushing 23, in which the rack rod 2 is slidably supported, and a seal member 24, which maintains a sealing relationship between the outer cylinder 20 and rack rod 2. With this arrangement, it is to be noted that the rack rod 2 is laterally oscillatable about the guide bush 23, which serves as a fulcrum point of such oscillatory movement, within limits of the backlash occurring between the teeth of rack 7 and pinion 8 with compressive deformation of the coiled spring 18. Reference numeral 25 indicates a tubular intermediate guide member for the rack rod 2 which has its base or right end portion fitted in the right end portion of the outer cylinder 20. Also, the guide member 25 is formed inside its outer end portion with an annular recess 26 in which a seal member 27 is fitted for sealing engagement with the rack rod 2. A narrow radially inwardly extending bearing projection 25a is also formed on the intermediate guide member 25 closely adjacent to the annular recess 26 for bearing engagement with the rack rod 2. The guide member 25 also includes a thin-walled intermediate portion 25, which is highly flexible, enabling the bearing projection 25a to follow any lateral displacement of the adjacent portion of rack rod 2 and thus the normal sealing function of the sealing member 27 is at all times maintained.

A cylinder cap 28 is fitted at its left-hand side end in the outer cylinder 20 and supports the left-hand side end portion of inner cylinder 21, which is securely fitted over the right end portion of the cylinder cap 28. The inner cylinder 21 has its right end portion floatingly supported on the intermediate guide member 25 with a coiled compression spring 29 interposed between the base end portion of guide member 25 and the adjacent end of inner cylinder 21 to allow relative axial movement therebetween. As will readily be noted, with this arrangement, the inner cylinder 21 is laterally oscillatable about the cylinder cap 28 as a fulcrum point of such oscillatory movement.

Further, securely fitted in the right-hand side end portion of the steering gear box 1 is a guide bushing 31 which has a tubular seat or bearing member 30 of rubber or the like elastic material secured to the outer periphery thereof. Fitted to the right-hand side end of the rack rod 2 is an annular plunger or fixture 32 which slides into the guide bushing 31 when the rack rod 2 is actuated close to the extreme end of its stroke. It is to be noted in this connection that, normally when free of any external restraints with no elastic deformation of the seat member 30, the guide bushing 31 has its center line $O_1$ offset a predetermined distance, e, from the center line $O_2$ of fixture 32 toward the side opposite to the pinion 8, as shown in FIG. 2.

The outer cylinder 20 of power actuator 19 is provided with a pair of oil hydraulic pressure ports 35 and 36 which are in fluid communication with the respective output ports 12 and 13 of control valve 9 by way of conduits 33 and 34, respectively. The oil pressure port 35 is in communication with the left-hand side chamber 21a, defined in the inner cylinder 21, through a radial aperture 37 formed in the cylinder cap 28 while the oil pressure port 36 is in communication with the right-hand side chamber 21b through an annular passage 38 defined between the outer and inner cylinders 20 and 21.

Referring again to FIG. 1, reference numeral 39 indicates a cushioning spring arranged around the rack rod 2 so as to be brought in abutting engagement with the cylinder cap 28 when the rack rod 2 is fully actuated to the left; and 40 indicates another cushioning spring arranged on the rack rod 2 so as to abut against the intermediate guide member 25 at the extreme end of leftward movement of the rack rod 2. Reference numeral 41 indicates corrugated tubular dust keepers respectively arranged between the steering gear box 1 and the left-hand side ball joint 3 and between the outer cylinder 20 and the right-hand side ball joint 3; and 42 indicates a line of duct communicating the interiors of dust keepers 41–41 with each other to enable the latter to extend and contract with ease and smoothness.

Description will next be made of the operation of the power steering device described above.

When the steering wheel, not shown, is operated by the driver to rotate the pinion shaft 5, for example, in the clockwise direction, the control valve 9 is actuated to place the output ports 13 and 12 in fluid communication with the high-pressure and low-pressure ports 10 and 11, respectively. As a result, oil hydraulic pressure is directed from the pressure source 14 through output port 13, conduit 34, port 36 and annular passage 38 into the right-hand side chamber 21b of inner cylinder 21 so that the actuator piston 22, fixed to the rack rod 2, is pushed leftward. The leftward thrust, acting together with the axial force being exerted upon the rack rod 2 through the pinion shaft 5 under the driver's effort, enables the rack rod 2 to be moved lightly to the left, thus substantially sparing the driver's effort. With the leftward movement of rack rod 2, oil in the left-hand side chamber 21a is forced to flow back into the oil reservoir 15 through ports 37 and 35, conduit 33 and low pressure port 11. In this manner, the steerable wheels of the vehicle is steered to the right to turn the vehicle to the right. Similarly, when the pinion shaft 5 is turned couterclockwise, the control valve 9 is operated this time in the opposite direction to allow the pressure oil from the source 14 to flow into the left-hand side chamber 21a while allowing the oil in the right-hand side chamber 21b to return to the oil reservoir 15 so that the rack rod 2 is lightly moved to the right and the vehicle is turned to the left.

During the steering operation, if under the road resistance to the steering of the steerable wheels the rack rod 2 is laterally oscillated or deflected about the guide bushing 23 as a fulcrum point and thus the actuator piston 22 is displaced sidewise, the inner cylinder 21 of power actuator 19, which is floatingly supported at the right-hand end, as described hereinbefore, oscillates together with the piston 22 about the cylinder cap 28 as a fulcrum point. In this manner, the normal concentric relation between the piston 22 and inner cylinder 21 of actuator 19 is maintained, enabling the piston 22 to slide smoothly within the inner cylinder 21.

Further, it is to be noted that, when in the steering of the vehicle to the right the maximum steering angle is approached or the rack rod 2 comes close to the left-hand side end of its stroke, the annular fixture 32 mounted on the rack rod 2 at its right-hand end plunges into the guide bushing 31 to be solidly supported therein with the result that the rigidity with which the right end portion of rack rod 2 is supported is substantially increased. Also, upon such solid fitting engagement of the fixture 32 and guide bushing 31, the elastic seat or bearing member 30 is radially deformed in an amount equal to the amount of offset or eccentricity e between the fixture 32 and guide bushing 31. This means that the fixture 32 and hence the rack rod 2 are laterally thrust in a direction away from the pinion 8 against the bias of coiled spring 18 so that the backlash between the intermeshing rack and pinion teeth is increased to reduce the pressure of meshing contact therebetween.

To summarize, in the power steering device of the present invention, the rack rod 2 is normally laterally oscillatable about the first guide member or bushing 23 and biased against the pinion 8 by spring means 18 so that occurrence of any excessively large pressure of contact between the meshing rack and pinion teeth is effectively avoided while at the same time making it possible for the backlash in the gearing to be automatically adjusted as the meshing teeth wear down in service. Further, in the device of the present invention, as the steering wheel is turned in a direction substantially to the fullest extent and that end portion of rack rod 2 which is normally free to oscillate comes close to the steering gear box 1, that rod end portion is solidly supported by the second guide member or guide bushing 31 in a manner such that the backlash between the rack and pinion teeth is increased. As a result, the rack rod 2 is supported as a whole with increased rigidity and the pressure of contact between the rack and pinion teeth is reduced to a substantial extent. It will thus be appreciated that any excessive deflection of rack rod 2 and seizing or galling of the meshing parts as resulting therefrom are effectively prevented and smooth operation of the rack rod 2 is at all times ensured.

Further, according to the present invention, in the power actuator arranged on the rack rod and comprised of a fixed, outer cylinder, an inner cylinder accommodated in the outer cylinder and having at least one end portion thereof supported in a floating fashion, and an actuator piston secured to the rack rod and slidably fitted in the inner cylinder, the actuator piston and the inner cylinder are freely laterally movable within the outer cylinder while maintaining the concentric relation therebetween even when the rack rod, of substantial axial length, is forced to bend under the road resistance to the steering movement so that the actuator piston is at all times smoothly operable and stable and accurate power steering operation is ensured.

Though one preferred embodiment of the invention has been shown and described herein, it will be apparent to those skilled in the art that many changes and modifications may be made therein without departing from the spirit of the invention and the scope of the appended claims.

What is claimed is:

1. A power steering device for automotive vehicles, comprising:
   a steering gear box secured to the vehicle chassis;
   a pinion shaft supported by said gear box and associated with the steering wheel of the vehicle;
   a rack rod formed with a rack in meshing engagement with said pinion shaft between a pair of right and left steerable wheels of the vehicle in linked relation therewith;
   an oil-hydraulic power actuator on said rack rod to drive the latter axially thereof;
   a first guide member slidably supporting one end portion of said rack rod and allowing the latter to laterally oscillate; and
   a second guide member in said gear box at the other end portion of said rack rod to slidably support the other end portion of said rack rod, and means for increasing backlash between the intermeshing rack and pinion teeth solely when the amount of steering motion approaches its maximum to place the other end portion of said rack rod close to said gear box.

2. A power steering device as claimed in claim 1, in which said power actuator includes a fixed, outer cylinder associated with said gear box and in which said first guide member is supported for slidably supporting said rack rod, an inner cylinder in said outer cylinder and supported therein at an end remote from said first guide member for floating movement, an actuator piston secured to said rack rod and slidably fitted in said inner cylinder to define therein a left-hand side and a right-hand side hydraulic chamber, a source of oil-hydraulic pressure, oil passage means connecting said left-hand side and right-hand side hydraulic chambers with said source of oil-hydraulic pressure, and a control valve inserted in said oil passage means to selectively place said hydraulic chambers in fluid communication with said source of oil-hydraulic pressure.

3. A power steering device as claimed in claim 2, in which said first guide member comprises a guide bushing arranged between said outer cylinder and said rack rod.

4. A power steering device as claimed in claim 2, in which said second guide member comprises a guide bushing arranged between said gear box and said rack rod and provided therearound with an elastic seat member.

5. A power steering device as claimed in claim 1, further comprising spring means for normally biasing said rack rod laterally against the pinion on said pinion shaft to eliminate any backlash between the intermeshing rack and pinion teeth.

* * * * *